United States Patent
Barrows et al.

(10) Patent No.: US 7,619,398 B2
(45) Date of Patent: Nov. 17, 2009

(54) PROGRAMMABLE ON-CHIP SENSE LINE

(75) Inventors: Corey K. Barrows, Colchester, VT (US); Douglas W. Kemerer, Essex Junction, VT (US); Douglas W. Stout, Milton, VT (US); Peter A. Twombly, Shelbarne, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/120,255

(22) Filed: May 14, 2008

(65) Prior Publication Data

US 2008/0211472 A1    Sep. 4, 2008

Related U.S. Application Data

(63) Continuation of application No. 11/275,535, filed on Jan. 12, 2006, now Pat. No. 7,397,228.

(51) Int. Cl.
*G05F 1/40* (2006.01)
*H02J 13/00* (2006.01)
*G05D 11/00* (2006.01)

(52) U.S. Cl. ............................ 323/282; 700/22; 700/286

(58) Field of Classification Search ................. 323/266, 323/268, 271, 282, 285, 349, 350, 351; 700/11–13, 700/20–23, 83, 286, 295, 297, 298
See application file for complete search history.

(56) References Cited

U.S. PATENT DOCUMENTS 5,498,972 A    3/1996    Haulin 5,694,329 A    12/1997   Pomatto
5,784,237 A    7/1998    Velez (Continued)

FOREIGN PATENT DOCUMENTS

JP    2003-132679    5/2003

(Continued)

OTHER PUBLICATIONS

Ajami et al., "Analysis of IR-Drop Scaling with Implications for Deep Submicron P/G Network Designs", Proc. Of the Fourth Inter. Symposium on Quality Electronic Design, 2003, pp. 1-6.

*Primary Examiner*—Matthew V Nguyen
(74) *Attorney, Agent, or Firm*—Gibb I.P. Law Firm, LLC; Michael LeStrange, Esq.

(57) ABSTRACT

Disclosed herein is a system for controlling power supply voltage to an on-chip power distribution network. The system incorporates a programmable on-chip sensing network that can be selectively connected to the power distribution network at multiple locations. When the sensing network is selectively connected to the power distribution network at an optimal sensing point, a local voltage feedback signal from that optimal sensing point is generated and used to adjust the power supply voltage and, thus, to manage voltage distribution across the power distribution network. Additionally, the system incorporates a policy for managing the voltage distribution across the power distribution network, a means for profiling voltage drops across the power distribution network and a means for selecting the optimal sensing point based on the policy and the profile. Another embodiment of the system can further control power supply voltages to multiple power distribution networks on the same chip.

9 Claims, 8 Drawing Sheets

U.S. PATENT DOCUMENTS

| | | |
|---|---|---|
| 6,396,137 B1 | 5/2002 | Klughart |
| 6,654,216 B2 | 11/2003 | Horvath et al. |
| 6,686,786 B2 | 2/2004 | Keeth et al. |
| 7,117,070 B2 * | 10/2006 | Chow et al. .................. 700/297 |
| 7,154,253 B1 * | 12/2006 | Gunther ...................... 323/283 |
| 7,248,946 B2 * | 7/2007 | Bashaw et al. .............. 700/286 |
| 7,337,342 B1 | 2/2008 | O'Brien |
| 7,340,325 B2 | 3/2008 | Sousa et al. |
| 2003/0125922 A1 | 7/2003 | Grochowski et al. |

FOREIGN PATENT DOCUMENTS

| | | |
|---|---|---|
| JP | 2004-146612 | 5/2004 |
| JP | 2004-151929 | 5/2004 |

* cited by examiner

PROGRAMMABLE ON-CHIP SENSE LINE

CROSS-REFERENCE TO RELATED APPLICATIONS

This application is a continuation of U.S. application Ser. No. 11/275,535 filed Jan. 12, 2006 which is now U.S. Pat. No. 7,397,228, the complete disclosure of which, in its entirety, is herein incorporated by reference.

BACKGROUND OF THE INVENTION

1. Field of the Invention

The invention relates generally to power distribution networks and, more particularly, to a system and method for continuously adjusting supply voltage to a power distribution network in order to manage voltage distribution across the power distribution network based on policy considerations.

2. Description of the Related Art

Power distribution in advanced technologies is becoming increasingly challenged by higher power densities and higher wire impedances, which can result in power supply voltage drops across a power distribution network. This, coupled with lower operating voltages, is making such power supply voltage (IR) drops a serious design consideration with respect to both power dissipation and performance. It would be advantageous to provide a system and method that can optimize power supply voltage compensation of supply voltage drops based on policy considerations. It would further be advantageous to provide a system and a method that can simultaneously maintain desired relationships between multiple power distribution networks on the same chip based on additional policy considerations.

SUMMARY OF THE INVENTION

In view of the foregoing, disclosed herein are embodiments of a system and method for controlling supply voltage to an on-chip power distribution network in order to manage voltage distribution across the power distribution network.

Embodiments of the system of the invention comprise an on-chip sensing network, an on or off-chip primary controller and an on or off-chip voltage controller. The sensing network has multiple switches (e.g., metal oxide semiconductor field effect transistor switches) that allow it to be selectively connected to any one of multiple locations on the power distribution network in order to generate local voltage feedback signals from the power distribution network. The primary controller is coupled by address lines to each of these switches and is adapted to control the switches via the address lines so as to selectively connect the sensing network to the power distribution network at a pre-selected location (i.e., a pre-selected optimal sensing point) in order to generate a local voltage feedback signal from that optimal sensing location. The voltage controller is coupled to the primary controller, to the sensing network, and to a drive transistor for the power distribution network. The voltage controller is adapted to receive the local voltage feedback signal generated at the optimal sensing point, to convert it into an opamp input signal (e.g., via a series of one or more resistors) so that it can be compared to a reference voltage signal, and to adjust the gate voltage of the drive transistor to regulate the supply voltage from the drive transistor based on this input signal. The regulated supply voltage is then forwarded to the power distribution network. Specifically, the voltage controller comprises an operational amplifier that is coupled to the drive transistor. The operational amplifier is used to adjust the gate voltage of the drive transistor by receiving both the input signal and a desired reference voltage signal and by continuously adjusting the gate voltage until the input signal is equal to the reference voltage signal.

In one embodiment of the invention, the system is further adapted to select the optimal sensing point on the power distribution network (i.e., the pre-selected location) based on the policy. Specifically, the primary controller can be programmed with a policy that dictates how voltage distribution across the power distribution network should be managed and can further be adapted to select the pre-selected location based on this policy. For example, the policy can dictate that the supply voltage should be regulated such that a minimum local voltage is maintained across the power distribution network. This can be accomplished by selecting as the pre-selected location that one of the multiple locations which exhibits the greatest amount of supply voltage drop relative to all others of the multiple locations. Alternatively, the policy can dictate that the supply voltage should be regulated such that a maximum local voltage is maintained across the power distribution network. This can be accomplished by selecting as the pre-selected location that one of the multiple locations which exhibits the least amount of supply voltage drop relative to all others of the multiple locations. The policy can also dictate that the supply voltage should be regulated such that an average local voltage is maintained across the power distribution network. This can be accomplished by selecting as the pre-selected location that one of the multiple locations that exhibits an amount of supply voltage drop approximately equal to an average supply voltage drop across the power distribution network.

In order to identify these locations on the power distribution network (i.e., the locations that exhibit the least amount of supply voltage drop, the greatest amount of supply voltage drop and an average amount of supply voltage drop), the system can be adapted to profile the voltage drops across the power distribution network. Specifically, the primary controller can initiate this profiling process by alternately connecting the sensing network to the power distribution network at each of the multiple locations in order to generate local voltage feedback signals from each of these locations (i.e., multiple local voltage feedback signals). These multiple local voltage feedback signals are passed along the sensing network to the voltage controller. The voltage controller can comprise an analog-to-digital converter that is adapted to receive these multiple local voltage feedback signals. The analog-to-digital converter can also be adapted to receive a supply voltage feedback signal from the drive device, to determine the differences between each of the multiple local voltage feedback signals and the supply voltage feedback signal, and to convert these differences into digital output. The digital output can be transmitted to the primary controller for further processing. For example, the primary controller can develop the profile of voltage drops across the power distribution network based on an analysis of the differences between the multiple local voltage feedback signals and a supply voltage feedback signal and then, select the optimal sensing point (i.e., the pre-selected location) based on both the profile and the policy. The system can further be adapted to develop different profiles of the voltage drops for different chip operating modes. Specifically, primary controller can initiate the profiling process for each different chip operating mode (e.g., based on power source used, activity level, type of activity, etc.).

In another embodiment of the invention, the system is adapted to control more than one power distribution network on the same chip. For example, the system can further comprise a second on-chip sensing network and a second voltage controller coupled to the primary controller. As with the first sensing network, the second sensing network can have second switches that allow the second sensing network to be selectively connected to a second power distribution network at any one of multiple second locations in order to generate second local voltage feedback signals. The second voltage controller can be coupled to the primary controller, the second sensing network and to a second drive transistor for the second power distribution network. The primary controller can be coupled by second address lines to each of the second switches and adapted to control the second switches via the second address lines so as to selectively connect the second sensing network to the an optimal sensing location on the second power distribution network (i.e., at a second pre-selected location) in order to generate a second local voltage feedback signal from that optimal sensing point. As with the first voltage controller, the second voltage controller can be adapted to receive the second local voltage feedback signal, to convert it into a second input signal (via a series of resistors) and to adjust the second gate voltage of the second drive transistor to regulate a second supply voltage based on the second input signal. In addition to the first policy which dictates how the voltage distribution across the first power distribution network should be managed, the primary controller of this embodiment can be programmed with a second policy that dictates how the second supply voltage should be regulated relative to the first supply voltage. For example, the second policy can dictate that the first and second power distribution networks should be maintained with the same voltage distributions (i.e., the same maximum, minimum or average local voltage) or with a desired static or on-demand separation between the supply voltages. The primary controller can also be programmed with a third policy that is similar to the first policy and dictates how voltage distribution across the second power distribution network should be managed.

Embodiments of the method of the invention for controlling supply voltage to a power distribution network on a chip in order to mange voltage distribution across the power distribution network comprises first providing an on-chip sensing network having multiple switches that allow the sensing network to be selectively connected (e.g., by a primary controller) to the power distribution network at any one of multiple locations. The sensing network can be selectively connected to the power distribution network at an optimal sensing point (i.e., pre-selected location) in order to generate a local voltage feedback signal from that optimal sensing point. A gate voltage of the drive transistor for the power distribution network is then adjusted (e.g., by a voltage controller) to regulate a supply voltage to the power distribution network based on an opamp input signal that is based on this local voltage feedback signal. Specifically, an operation amplifier within the voltage controller can continuously compare a desired reference voltage to the input signal and can adjust the gate voltage of the drive transistor until input signal is equal to the reference voltage signal.

Additionally, an optimal sensing point (i.e., a pre-selected location) can be selected by establishing a policy for controlling power supply voltage distribution across the power distribution network, by developing a profile of voltage drops across the power distribution and by selecting the location based on both the policy and the profile. For example, a user can establish a policy that dictates that the supply voltage should be regulated such that a minimum local voltage is maintained across the power distribution network or a maximum local voltage is maintained across the power distribution network. Alternatively, the user can establish a policy that dictates that the supply voltage should be regulated such that an average local voltage is maintained for the power distribution network. In order to develop the profile, the sensing network can be alternately connected to the power distribution network (e.g., by switches controlled by a primary controller via address lines) at each of multiple locations on the power distribution network so as to generate local voltage feedback signals from each of these locations (i.e., multiple local voltage feedback signals). Then, differences between each of the multiple local voltage feedback signals and a supply voltage feedback signal can be determined (e.g., by an analog-to-digital converter in a voltage controller). These differences can be analyzed (e.g., by the primary controller, discussed above) in order to generate the profile of voltage drops. Then, the optimal sensing point for implementing the established policy can be selected (e.g., by the primary controller) based on the profile. For example, to regulate the supply voltage such that a minimum local voltage is maintained across the power distribution network, that location that exhibits the greatest amount of supply voltage drop relative to all others of the multiple locations can be selected. To regulate the supply voltage such that a maximum local voltage is maintained across the power distribution network, that location that exhibits the least amount of supply voltage drop relative to all others of the multiple locations can be selected. To regulate the supply voltage such that an average local voltage is maintained, that location that exhibits closes to an average supply voltage drop relative to all others of the multiple locations can be selected. Different profiles can be developed for different chip operating modes such that the optimal sensing point for implementing the policy in one operating mode may be different from the optimal sensing point for implementing the policy in another operating mode.

Another embodiment of the method comprises not only controlling the supply voltage to one on-chip power distribution network, but controlling the supply voltages to multiple discrete on-chip power distribution networks. For example, the method can comprise providing the system, as described above and including a second on-chip sensing network having second switches that allow the second sensing network to be selectively connected to a second power distribution network on the chip at any one of multiple second locations in order to generate second local voltage feedback signals. The second sensing network can be selectively connected to the second power distribution network at an optimal sensing location (i.e., second pre-selected location) in order to generate a second local voltage feedback signal from the second pre-selected location. A second gate voltage of a second drive transistor for the second power distribution network can be adjusted to regulate a second supply voltage, in a manner similar to that described above with regard to the first power distribution network. Additional policies programmed into the system can dictate how the second supply voltage should be regulated relative to the first supply voltage as well as how voltage distribution across the second power distribution network should be managed.

These, and other, aspects and objects of the present invention will be better appreciated and understood when considered in conjunction with the following description and the accompanying drawings. It should be understood, however, that the following description, while indicating embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
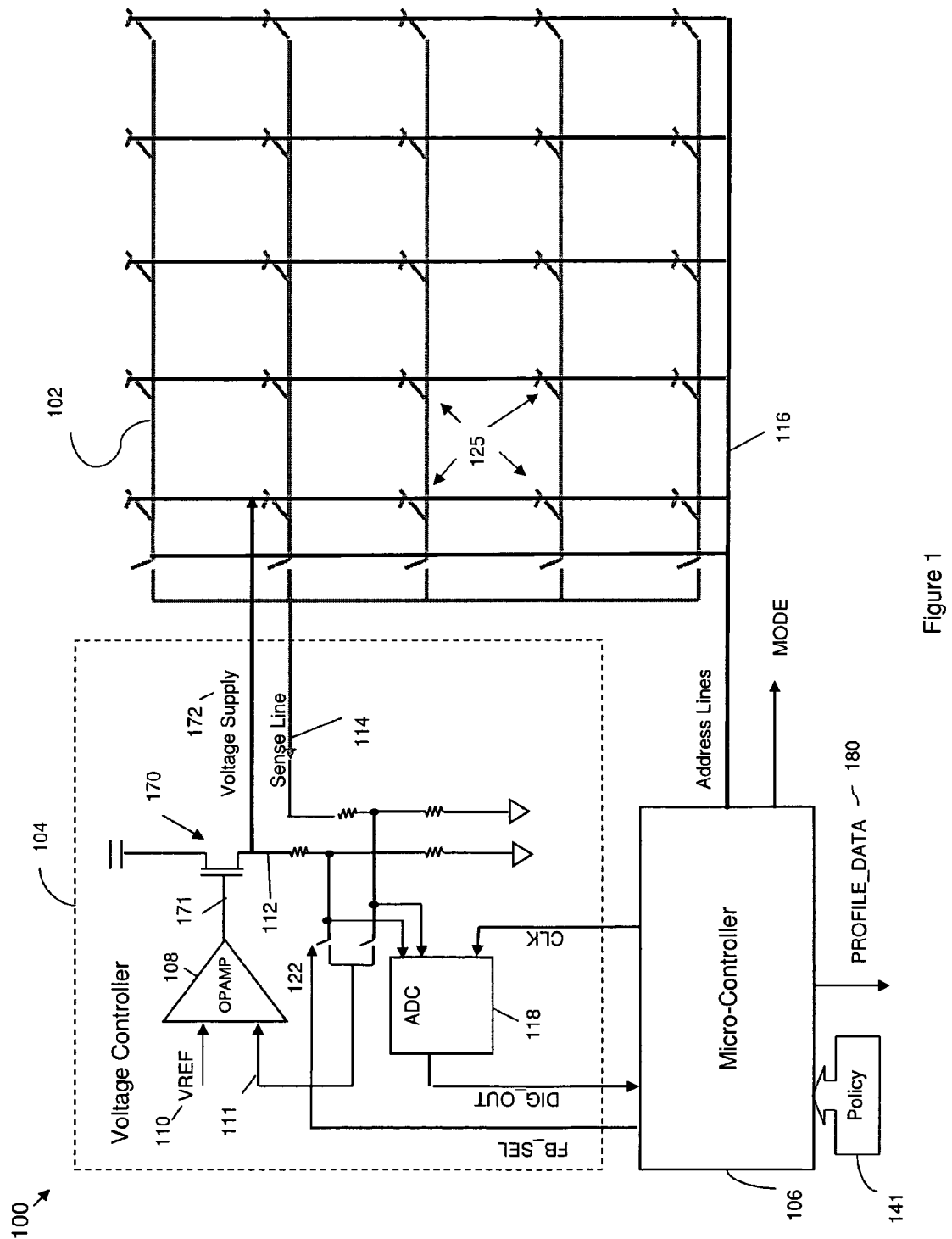
FIG. 1 is a schematic diagram of an embodiment of the system of the invention.

The present invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

As mentioned above, power distribution in advanced technologies is becoming increasingly challenged by higher power densities and higher wire impedances, which can result in power supply voltage drops across a power distribution network. This, coupled with lower operating voltages, is making such power supply voltage (IR) drops a serious design consideration with respect to both power dissipation and performance. Therefore, disclosed below are embodiments of a system and method for controlling power supply voltage to an on-chip power distribution network in order to manage voltage distribution across the power distribution network. The system and method incorporate a sensing network that can be selectively connected to a power distribution network at multiple different locations in order to generate local voltage feedback signals. When the sensing network is connected to the power distribution network at a pre-selected location (e.g., an optimal sensing point), the local voltage feedback signal from that pre-selected location can be used to adjust the power supply voltage and, thus, local voltage distribution across the power distribution network. Additionally, the system and method can incorporate a policy for managing the voltage distribution across the network by regulating the power supply voltage, a means for profiling voltage drops across power distribution network and a means for selecting an optimal sensing point (i.e., the pre-selected location) based on both the policy and the profile. Another embodiment of the system and method can further control power supply voltage to multiple discrete power distribution networks on the same chip.

Referring to FIG. 1, embodiments of the system 100 of the invention comprise an on-chip sensing network 102, an on or off-chip primary controller 106 (e.g., a micro controller) and an on or off-chip voltage controller 104. The sensing network 102 has multiple switches 125 (e.g., metal oxide semiconductor field effect transistor switches) that allow it to be selectively connected to any one of multiple locations 126 on the power distribution network 150 (see FIG. 2) in order to generate and transmit local voltage feedback signals 114 from the power distribution network 150 to the voltage controller 104. The primary controller 106 is coupled by address lines 116 to each of these switches 125 (see FIGS. 2 and 3). For example, the primary controller 106 can generate sense line addresses using column and row decode lines to control switches at each cross section on the grid. The primary controller 106 can further be adapted to selectively connect the sensing network 102 to the power distribution network 150 at a pre-selected location 126A (e.g., an optimal sensing point) and thus, generate and transmit a local voltage feedback signal corresponding to the optimal sensing point from the sensing network to the voltage controller. Thus, the sensing network 102 comprises a programmable feedback path between various points 126 on a power grid 150 and a voltage controller 104.

Figure 4:
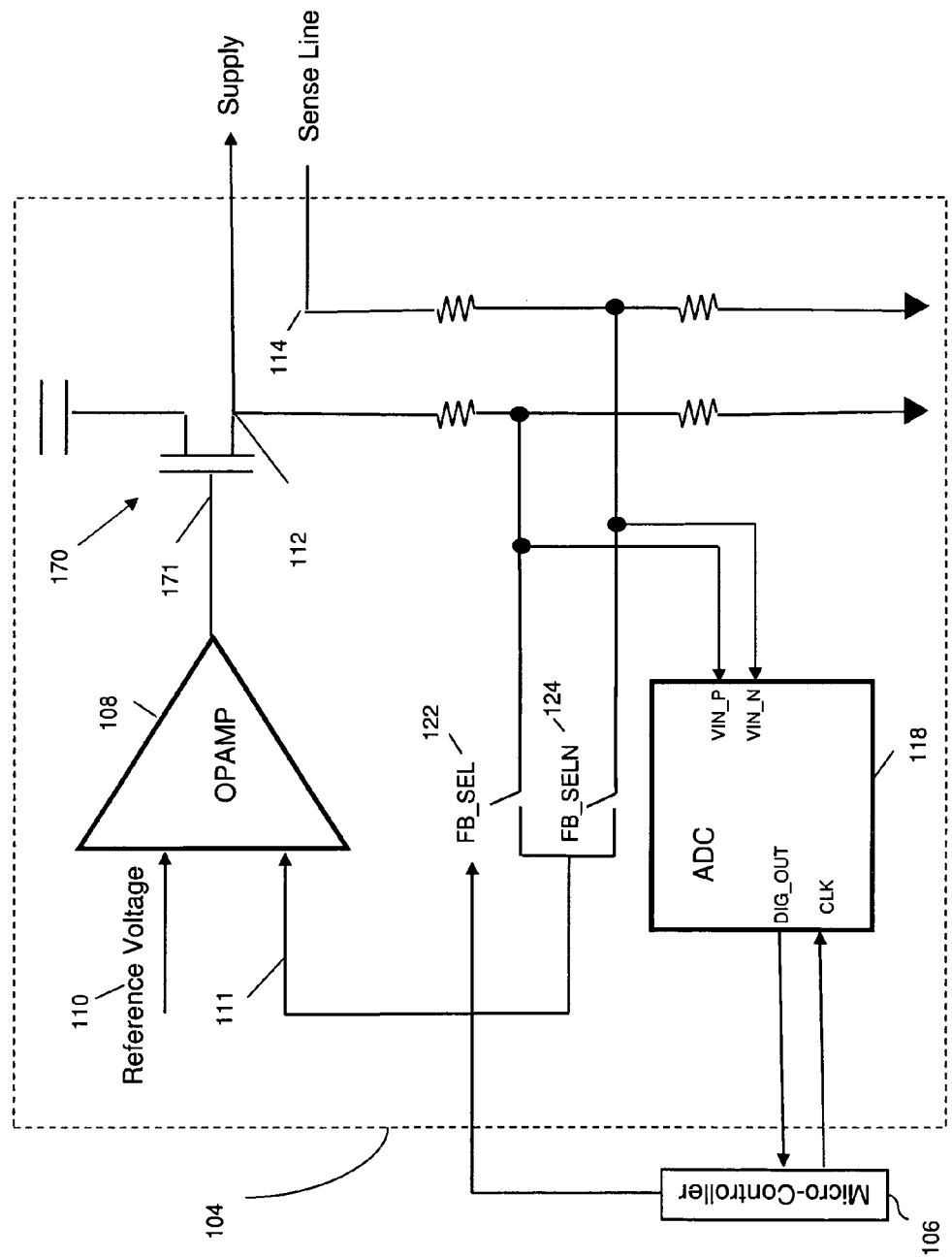
FIG. 4 is a schematic diagram of an exploded view of the voltage controller.

Referring to FIG. 4, the voltage controller 104 is coupled to the primary controller 106, to the sensing network 102, and to a drive transistor 170 for the power distribution network 102. When using the voltage controller 104 to regulate the supply voltage based on a local voltage feedback signal 114 received from an optimal sensing point (e.g., as selected and addressed by the microcontroller 106 (see discussion below), FB_SELN 124 is closed and FB_SEL 122 is opened as signaled by the microcontroller 106 so that VIN_N represents the input signal 111. More particularly, the voltage controller 104 is adapted to receive from the sensing network 102 a local voltage feedback signal 114 corresponding to a pre-selected location 126A (i.e., an optimal sensing point) and to convert that signal 114 into an opamp input signal 111. The local voltage feedback signal 114 is converted into the opamp input signal 111 so that it can be directly compared to a reference voltage signal 111. For example, if the reference voltage signal is 1V and the supply voltage is 2V, the local voltage feedback signal can be proportionally reduced via a series of one or more resistors in order to allow a direct comparison. The voltage controller 104 can also comprise an operational amplifier 108 that is coupled to the drive transistor 170 so that it can be used to adjust the gate voltage 171 of the drive transistor 170. Specifically, the operational amplifier 108 can receive the opamp input signal 111 as well as the desired reference voltage (Vref) signal 110 and can adjust the gate voltage 171 until the opamp input signal 111 is equal to the reference voltage signal 110. The regulated supply voltage 172 is then forwarded to the power distribution network 150.

Figure 2:
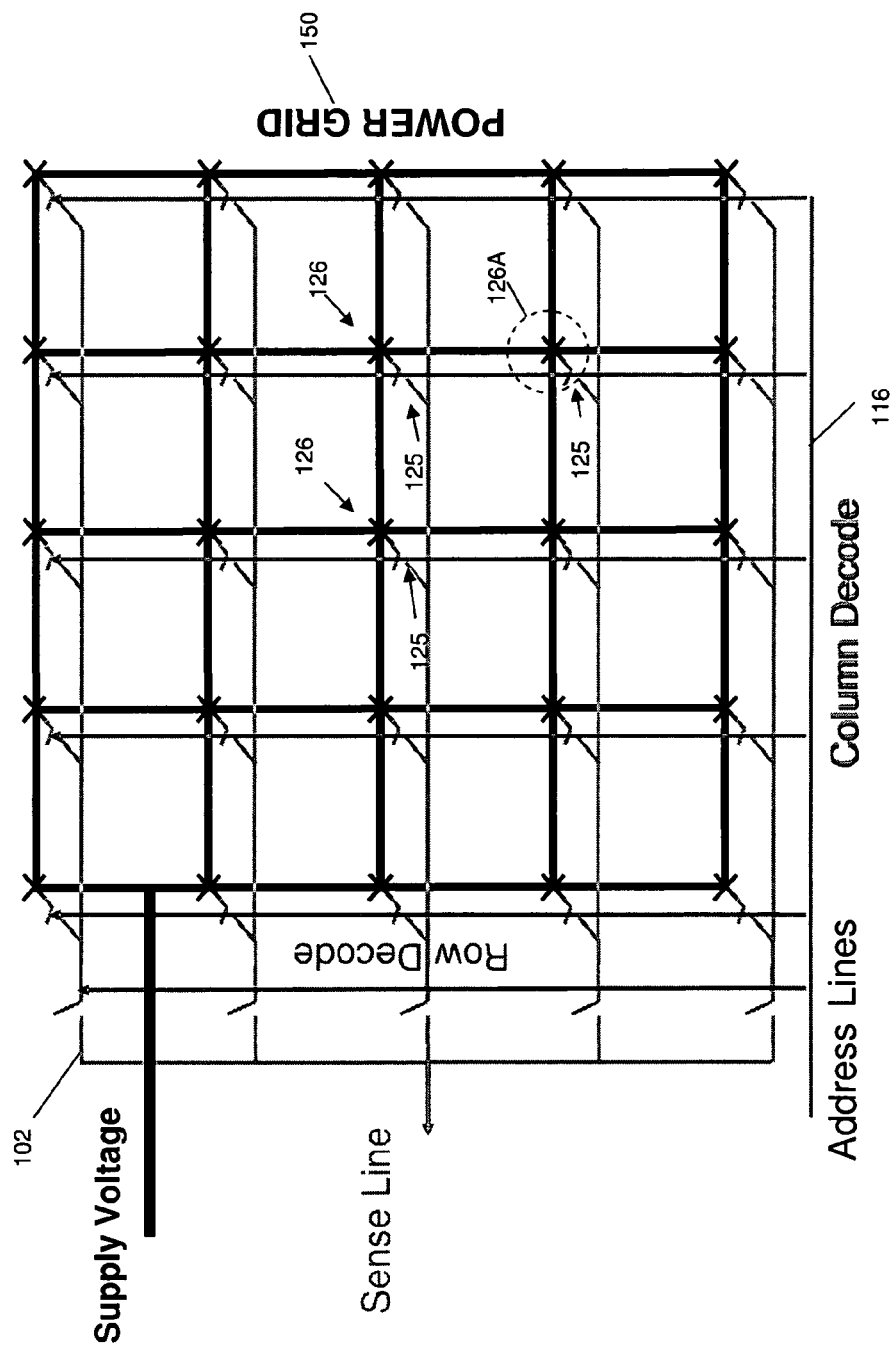
FIG. 2 is a schematic diagram of an exploded view the sensing network and address lines relative to a power distribution network.
Figure 3:
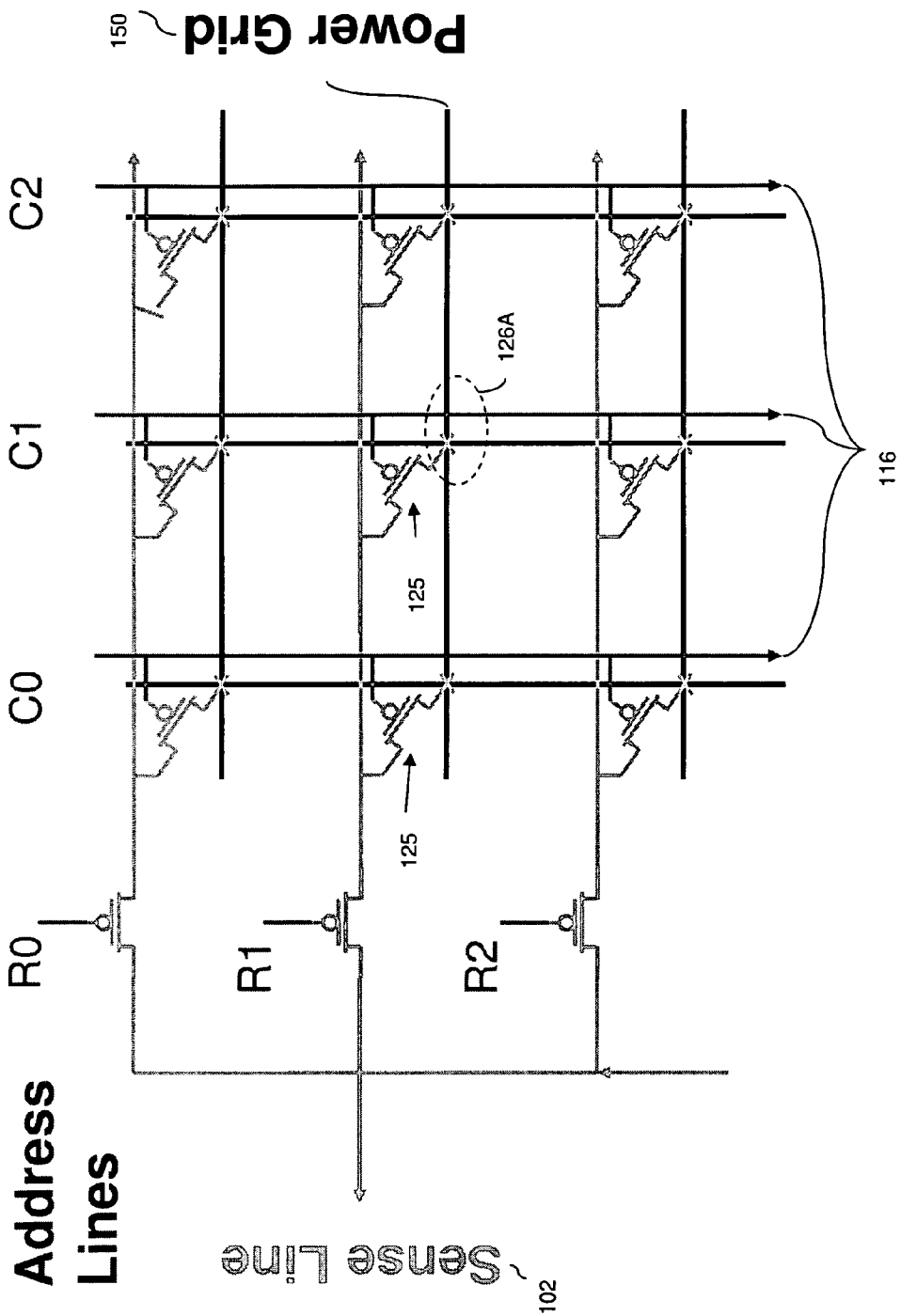
FIG. 3 is a schematic diagram of another exploded view of the sensing network and address lines.

In one embodiment of the invention, the system 100 is further adapted to select the optimal sensing point (i.e., the pre-selected location 126A) (see FIGS. 2-3). Specifically, supply voltage differences (or IR drops) between selected sense points 126 on the programmable sense line 102 and the near end voltage from the drive device 170 are digitized and accumulated using an analog-to-digital converter (ADC) 118 and the micro-controller 106. Then, the micro-controller 106 processes the accumulated data to determine the optimal sense point 126A based on a predetermined policy 141.

More specifically, the primary controller 106 can be programmed with a policy 141 that dictates how voltage distribution across the power distribution network 150 should be managed and can further be adapted to select the pre-selected location 126A based on this policy 141. For example, the policy 141 can dictate that the supply voltage should be regulated such that a minimum local voltage is maintained across the power distribution network 150. This can be accomplished by selecting as the pre-selected location 126A that one of the multiple locations 126 which exhibits the greatest amount of supply voltage drop relative to all others of the multiple locations. Alternatively, the policy 141 can dictate that the supply voltage should be regulated such that a maximum local voltage is maintained across the power distribution network 150. This can be accomplished by selecting as the pre-selected location 126A that one of the multiple locations 126 which exhibits the least amount of supply voltage drop relative to all others of the multiple locations. The policy 141 can also dictate that the supply voltage should be regulated such that an average local voltage is maintained across the power distribution network 150. This can be accomplished by selecting as the pre-selected location 126A that one of the multiple locations 126 that exhibits an amount of supply voltage drop approximately equal to an average supply voltage drop across the power distribution network.

Referring to FIGS. 1 and 4 in combination, in order to identify these locations on the power distribution network 150 (i.e., the locations that exhibit the least amount of supply voltage drop, the greatest amount of supply voltage drop and an average amount of supply voltage drop), the system 100 can be adapted to profile the voltage drops across the power distribution network 150. Specifically, the microcontroller 106 will signal FB_SEL 122 to close and FB_SELN to open so that VIN_P represents the input signal 111. Thus, the opamp input signal 111, during this operation, is based on the supply voltage feedback signal 112. The primary controller 106 can then initiate this profiling process by alternately (e.g., incrementally) connecting the sensing network 102 to the power distribution network 150 at each of the multiple locations 126 in order to generate local voltage feedback signals from each of these locations (i.e., multiple local voltage feedback signals). Thus, the system 100 samples the local voltages at multiple locations throughout the power distribution network.

These multiple local voltage feedback signals are passed along the sensing network 102 to the voltage controller 104. Resistors may be used to establish biasing conditions. The voltage controller 104 can comprise the analog-to-digital converter (ADC) 118 (e.g., a low resolution analog-to-digital converter) that is adapted (e.g., by virtue of a sample clock controlled by the primary controller) to receive these multiple local voltage feedback signals. The analog-to-digital converter 118 can also be adapted to receive a supply voltage feedback signal 112 from the drive device 170 (i.e., a "near-end" feedback signal), to determine the differences between each of the multiple local voltage feedback signals 114 and the supply voltage feedback signal 112, and to convert these differences into digital output (DIG OUT) 122. Specifically, the supply voltage (IR) drop between the "near-end" out (i.e., supply voltage feedback signal 112 from the drive device 170) and the local voltage feedback signals 114 from the sense line can be digitized using the low resolution differential analog-to-digital converter 118 that is incorporated into the voltage controller 104.

The DIG OUT 122 can be transmitted to the primary controller 106 for further processing (i.e., the ADC's clock and output data is driven and read by the micro-controller 106). The primary controller 106 can then develop the profile 180 of voltage drops across the power distribution network 150 based on an analysis of the differences between the multiple local voltage feedback signals 114 and a supply voltage feedback signal 112 (i.e., an analysis of the digital data) and then, select the optimal pre-selected location 126A based on both the profile 180 and the policy 141. The system 100 can further be adapted to develop different profiles of the voltage drops for different chip operating modes. Specifically, the primary controller 106 can initiate the profiling process for each different chip operating mode (e.g., based on power source used, activity level, type of activity, etc.).

Figure 5:
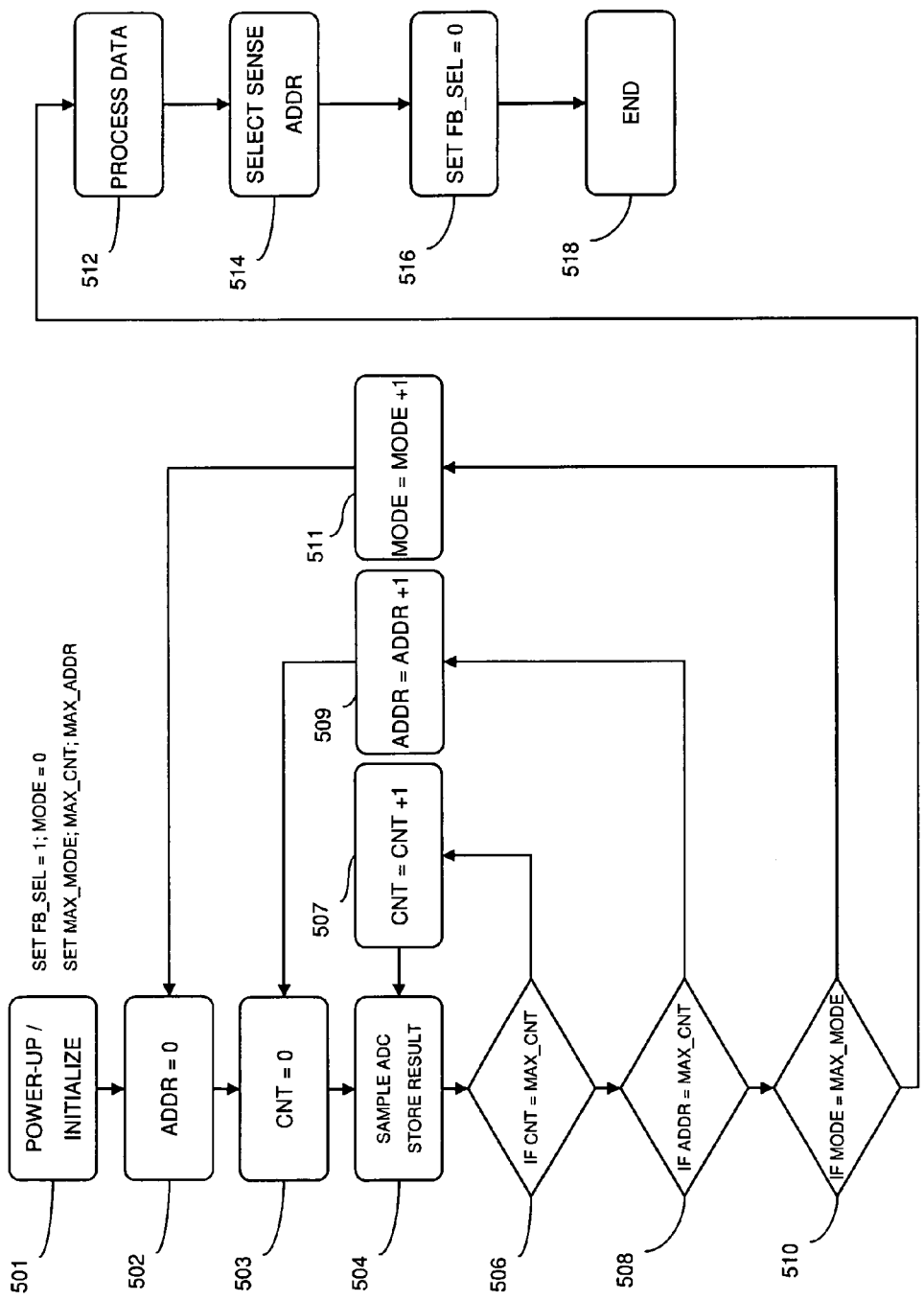
FIG. 5 is flow diagram illustrating an exemplary implementation algorithm.

More particularly, the primary controller (e.g., either on or off-chip micro-controller) can be used to control the operation of the system 100, and depending on the user's preference, it can take on a variety configurations. For example, the example provided below and the algorithm illustrated in FIG. 5, depict a system 100 with six temporary registers (CNT, MAX_CNT, MODE, MAX_MODE, ADDR and MAX_ADDR), 4 output signals (FB_SEL, ADC_CLK, MODE, and ADDR), one input (ADC_OUT), and read/write memory space. CNT denotes the sample count. MAX_CNT denotes the number samples to be taken at each sense point. ADDR denotes the active sense point address. MAX_ADDR denotes the number of sense points. MODE denotes the chip operating mode. Lastly, MAX_MODE denotes the number of chip operating modes. Upon power-up (501), the micro-controller sets FB_SEL to connect the "near end" ouput to the negative input of the opamp. CNT, MAX_CNT, ADDR, MODE, MAX_MODE and MAX_ADDR are also set to their initialization states. Once initialized, the micro-controller increments ADDR, taking MAX_CNT samples at each point, while storing the results to memory (502-511). This process can be repeated for multiple chip operating modes. With all the data that is collected for each ADDR and MODE, the micro-controller can process the data in variety of ways to profile the power grid (512). Techniques ranging from simple averaging to very complex DFT can be used to analyze the data and select the optimal sense point (514). Once the optimal sense point 126A is selected, the micro-controller 106 loads ADDR with the corresponding address and sets FB_SEL to '0' (i.e., it closes FB SELN 124 and opens FB SEL 122) (516).

The system then resumes normal operation of the voltage controller 104, as discussed above, using the selected optimal sense point 126A. Thus, the ADC 118 and micro-controller 106 essentially operate only during the calibration phase (i.e., during the optimal sense point selection phase), when the FB_SEL 122 is closed and FB_SELN 124 is open. Specifically, the supply voltage differences (or IR drops) between selected sense points 126 on the programmable sense line 102 and the near end voltage are digitized and accumulated using the ADC 118 and micro-controller 106. Then, the micro-controller 106 processes the accumulated data to determine the optimal sense point 126A based on the predetermined policy 141. Once the micro-controller 106 has selected the optimal sense point 126A, it closes FB SELN 124, opens FB SEL 122 and connects the power grid 150 to the sense line 102 at this sense point 126A. A local voltage feedback signal is generated from this point 126A and the voltage controller 104 works to sustain the desired voltage at this point of interest in order to compensate for the IR drop.

Figure 6:
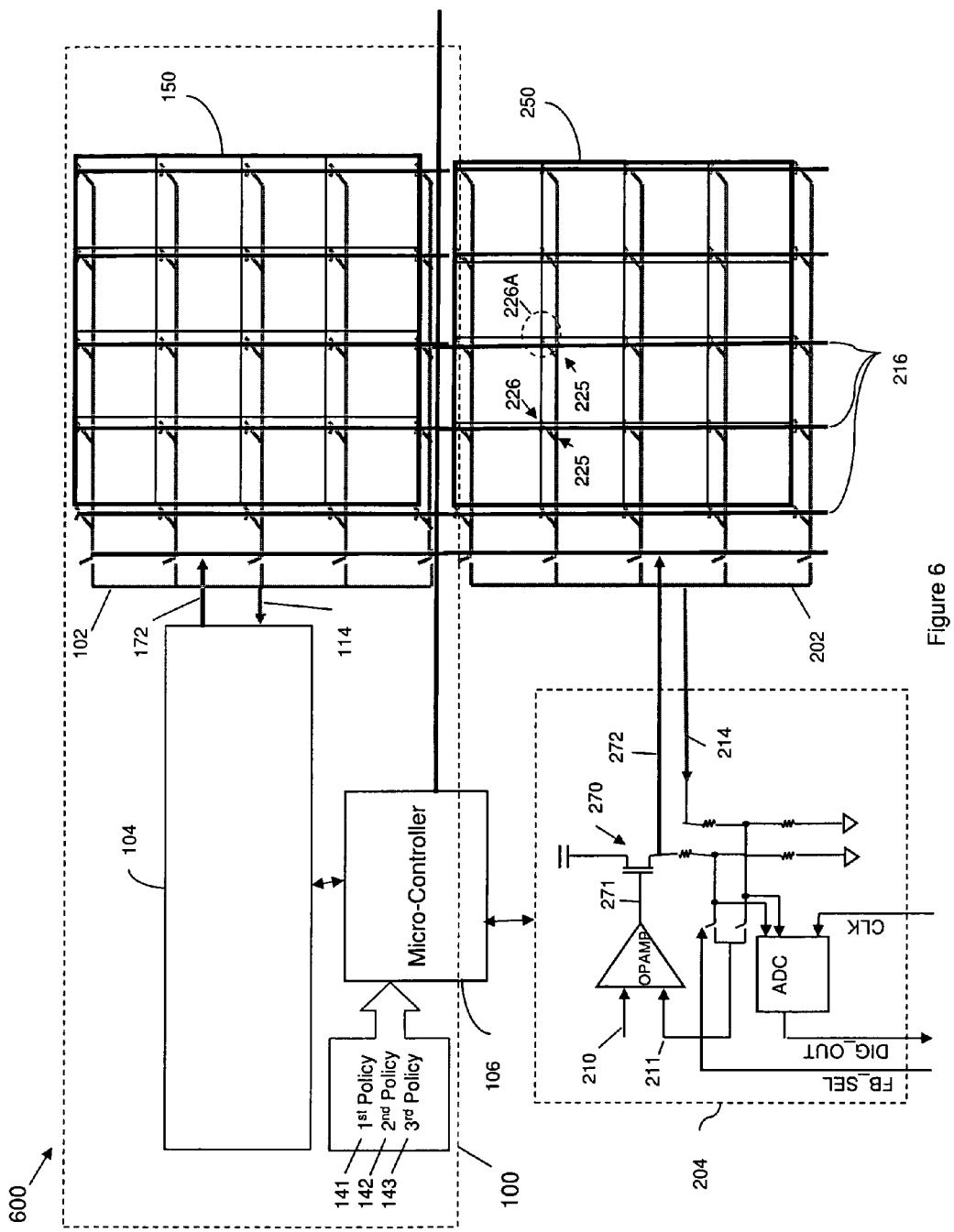
FIG. 6 is a schematic diagram of another embodiment of the system of the invention.

Referring to FIG. 6, in another embodiment of the invention, the system 600 can be adapted to control more than one power distribution network on the same chip. For example, the system 600 can comprise the system 100 of FIG. 1 as well as a second on-chip sensing network 202 and a second voltage controller 204 coupled to the primary controller 106.

As with the first sensing network 102, the second sensing network 202 can have second switches 225 that allow the second sensing network 202 to be selectively connected to a second power distribution network 250 at any one of multiple second locations 226 in order to generate second local voltage feedback signals 214. The second voltage controller 204 can be coupled to the primary controller 106, the second sensing network 202 and to a second drive transistor 270 for the second power distribution network 250. The primary controller 106 can be coupled by second address lines 216 to each of the second switches 225 and adapted to control the second switches 225 via the second address lines 216 so as to selectively connect the second sensing network 202 to the second power distribution network 250 at an optimal sensing point on the second power distribution network (i.e., a second pre-selected location 226A) in order to generate a second local voltage feedback signal 214 corresponding the this optimal sensing point. As with the first voltage controller 104, the second voltage controller 204 can be adapted to receive the second local voltage feedback signal 214, to convert it into a second input signal 211 (e.g., via a series of resistors) and to adjust the second gate voltage 271 of the second drive transistor 270 to regulate a second supply voltage 272 from the second drive transistor 270 to the second power distribution network 250 based on the second input signal 211.

In addition to the first policy 141 which dictates how the voltage distribution across the first power distribution network 150 should be managed, the primary controller 106 of this embodiment can be programmed with a second policy 142 that dictates how the second supply voltage 272 should be regulated relative to the first supply voltage 172. For example, the second policy 142 can dictate that the first and second power distribution networks 150,250 should be maintained with the same voltage distributions (i.e., the same maximum, minimum or average local voltage), with a desired static separation between the voltage distributions, or with demand-based separations between the voltage distributions. The primary controller 106 can also be programmed with a third policy 143 that is similar to the first policy 141 and that dictates how voltage distribution across the second power distribution network 250 should be managed.

Figure 7:
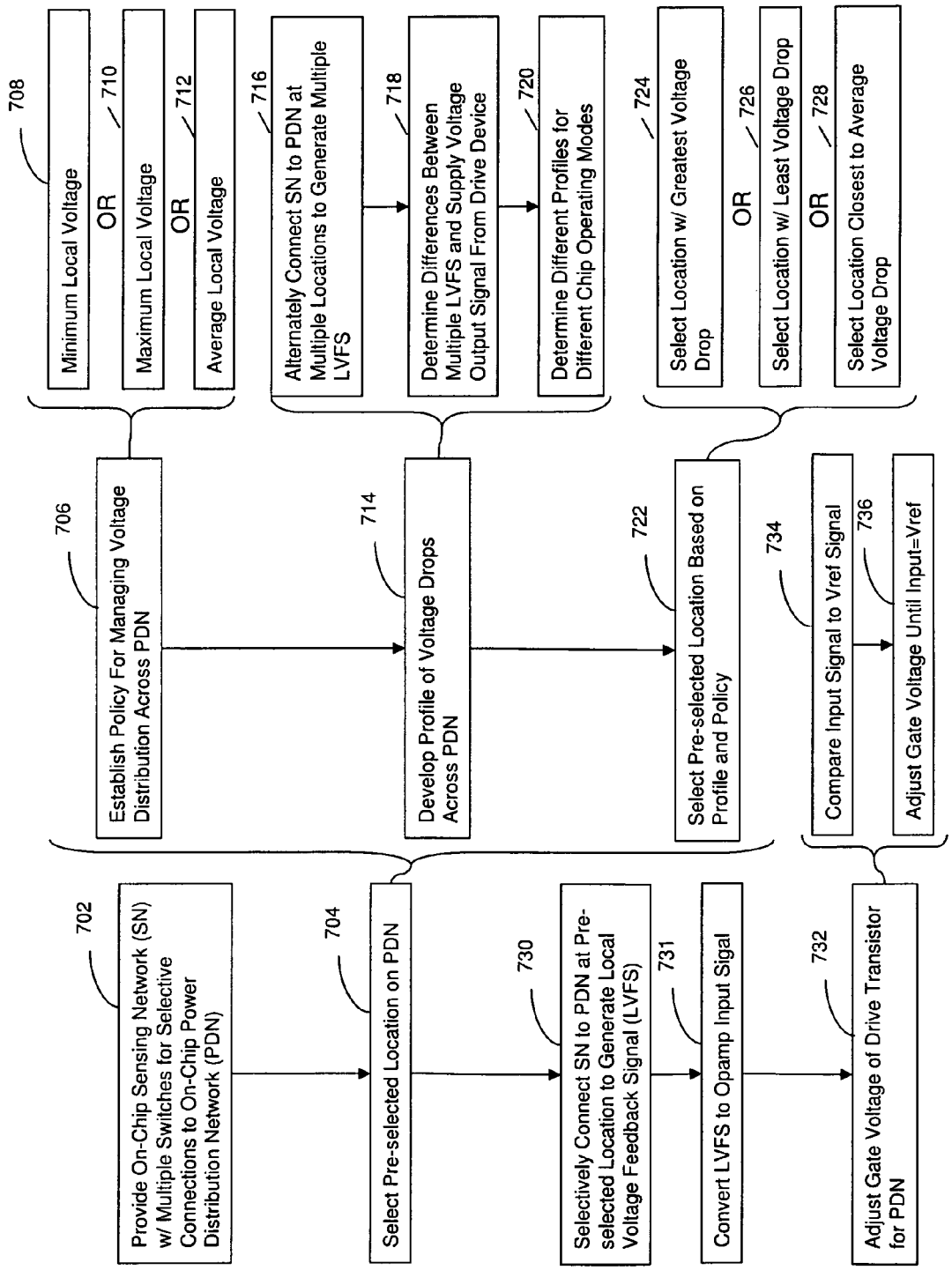
FIG. 7 is a flow diagram illustrating an embodiment of a method of the invention.

Referring to FIG. 7, embodiments of the method of the invention for controlling supply voltage to a power distribution network on a chip in order to manage voltage distribution across the power distribution network comprise first providing an on-chip sensing network 102 having multiple switches 125 (e.g., controlled by a primary controller 106) that allow the sensing network 102 to be selectively connected to the power distribution network at any one of multiple locations 126 (702, see FIG. 1). The sensing network 102 is selectively connected to the power distribution network 150 at a pre-selected location 126A (i.e., an optimal sensing location, see FIGS. 2-3) in order to generate a local voltage feedback signal from that pre-selected location (704-730). The voltage controller 104 receives the local voltage feedback signal 114 and converts it into an opamp input signal 111 (e.g., via a series of resistors so that it may subsequently compared directly to a voltage reference signal, as discussed above) (731). Then, a gate voltage 171 of the drive transistor 170 for the power distribution network 150 is adjusted based on this opamp input signal so as to regulate the supply voltage 172 (732, see FIG. 4). Specifically, an operational amplifier 108 within the voltage controller 104 can continuously compare a desired reference voltage 110 to the opamp input signal 111 (734) and can adjust the gate voltage 171 of the drive transistor 170 until the opamp input signal 111 is equal to the desired reference voltage signal 110 (736).

Additionally, an optimal sensing location (i.e., a pre-selected location 126A) can be selected (at process 704) by establishing a policy 141 for controlling power supply voltage distribution across the power distribution network (706), by developing a profile of voltage drops across the power distribution (714) and by selecting the location based on both the policy and the profile (722).

For example, a user can establish a policy (at process 706) that dictates that the supply voltage should be regulated such that a minimum local voltage is maintained across the power distribution network or a maximum local voltage is maintained across the power distribution network (708 or 710). Alternatively, the user can establish a policy (at process 706) that dictates that the supply voltage should be regulated such that an average local voltage is maintained for the power distribution network (712).

In order to develop the profile (at process 714), the sensing network can be selectively connected to the power distribution network at each of the multiple locations individually so as to generate local voltage feedback signals from each of the multiple locations, e.g., by alternately turning on and off each of the switches (716). Then, differences between each of the multiple local voltage feedback signals and a supply voltage feedback signal can be determined (e.g., by an analog-to-digital converter in a voltage controller) (718). These differences can be analyzed (e.g., by the primary controller discussed above) in order to generate the profile of voltage drops.

Then, the optimal sensing point (i.e., the pre-selected location) for implementing the established policy can be selected (e.g., by the primary controller) based on the profile and the policy (722). For example, to regulate the supply voltage such that a minimum local voltage is maintained across the power distribution network, that location that exhibits the greatest amount of supply voltage drop relative to all others of the multiple locations can be selected (724). To regulate the supply voltage such that a maximum local voltage is maintained across the power distribution network, that location that exhibits the least amount of supply voltage drop relative to all others of the multiple locations can be selected (726). To regulate the supply voltage such that an average local voltage is maintained, that location that exhibits closes to an average supply voltage drop relative to all others of the multiple locations can be selected (728).

Different profiles can be developed for different chip operating modes such that the optimal pre-selected location for implementing the policy in one operating mode may be different from the optimal pre-selected location for implementing the policy in another operating mode (720).

Figure 8:
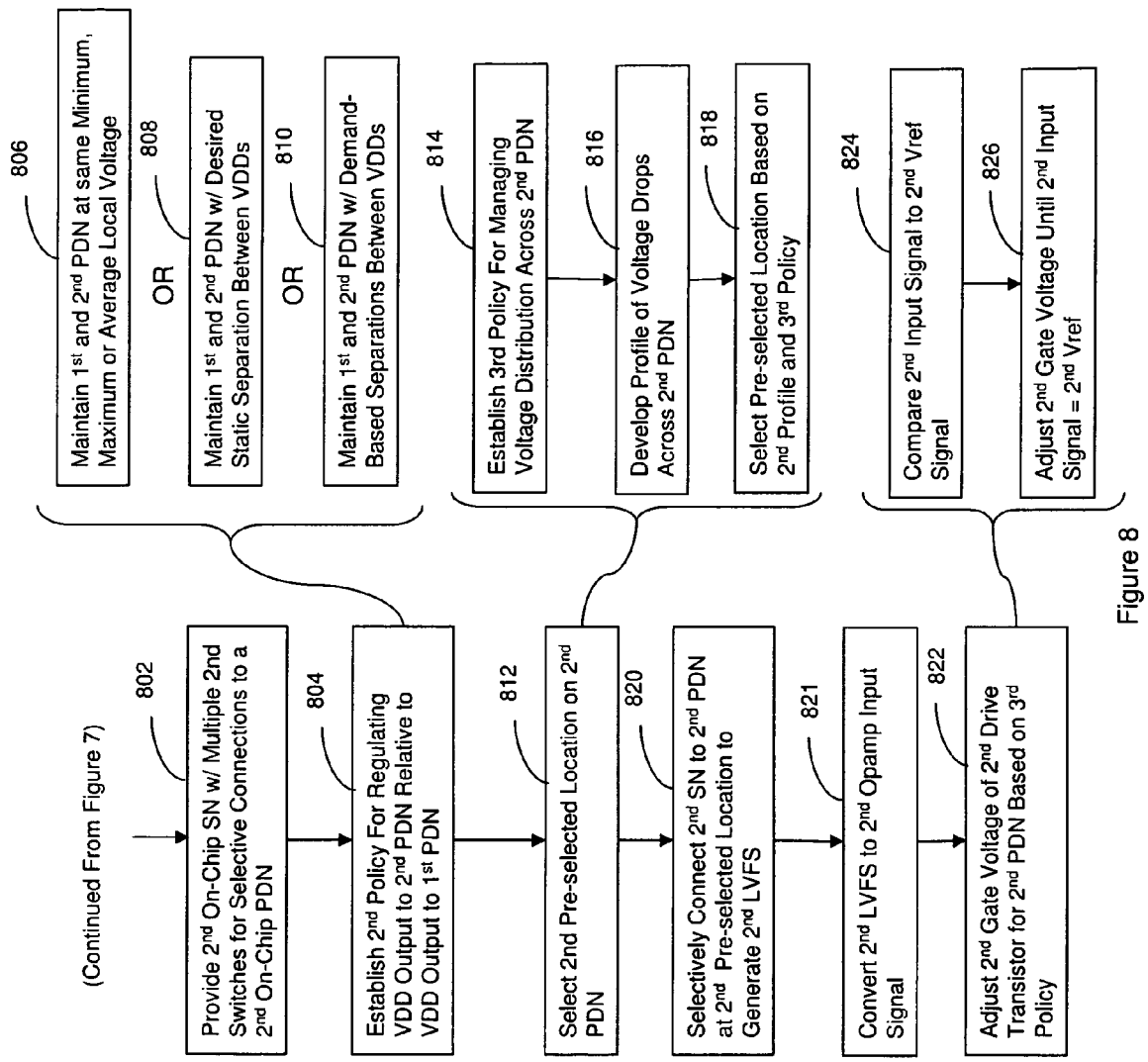
FIG. 8 is a flow diagram illustrating another embodiment of a method of the invention.

Referring to FIG. 8, another embodiment of the method comprises not only controlling the supply voltage to one on-chip power distribution network (as illustrated in FIG. 7 and described above), but controlling the supply voltages to multiple discrete on-chip power distribution networks. For example, the method can comprise providing the system 600, described above and illustrated in FIG. 6, including a second on-chip sensing network 202 having second switches 225 that allow the second sensing network 202 to be selectively connected to a second power distribution network 250 on the chip at any one of multiple second locations 226 in order to generate second local voltage feedback signals 214 (802).

Simultaneously controlling the power supply voltages to both the first and second power distribution networks 150, 250 can be accomplished by establishing a policy (i.e., a second policy 142 programmed into the primary controller 106) that dictates how the second supply voltage 272 should be regulated relative to the first supply voltage 172 (804). For example, the second policy 142 can dictate that the first and second power distribution networks should be maintained with the same local voltage requirements (e.g., the same minimum local voltage, the same maximum local voltage or the same average local voltage) (806). Alternatively, the second policy 142 can dictate that the first and second power distribution networks 150,250 are maintained with a desired static or on-demand separation between supply voltages (808-810).

As with the first power distribution network 150, described in greater detail above, an optimal sensing location 226A on the second power distribution network (i.e., a second pre-selected location 226A) can be selected by establishing a policy (i.e., a third policy 243) for managing voltage distribution across the second power distribution network and is compatible with the second policy (814), by developing a profile of voltage drops across the second power distribution network (816), and by selecting the optimal sensing location based on the profile and the policy (818).

The second sensing network 202 can then be selectively connected to the second power distribution network 250 at this second pre-selected location 226A in order to generate a second local voltage feedback signal 214 from this location 226A (820). The second voltage controller 204 receives the second local voltage feedback signal 214 and converts it into a second opamp input signal 211 (e.g., via a series of resistors) (731). Then, a second gate voltage 271 of a second drive transistor 270 for the second power distribution network 250 can be adjusted to regulate the second supply voltage 272, in a manner similar to that described above for the first power distribution network (822). For example, the second opamp input signal 211 can be compared to a second desired reference voltage (824) and the second gate voltage can be adjusted until the second reference voltage signal is equal to the second opamp input signal (826).

Therefore, disclosed above are a system and method that can be used to minimize power dissipation and maximize reliability for a specified performance. The system and method can further be used to maximize performance and/or yield for a specified reliability target. Lastly, the system and method may be used to increase visibility into a chip's power profile for continued learning and improvement. More particularly, disclosed above are a system and method for controlling power supply voltage to a power distribution network in order to manage voltage distribution across the power distribution network. The system and method incorporate a sensing network that can be selectively connected to the power distribution network at multiple locations in order to generate local voltage feedback signals. When the sensing network is connected to the power distribution network at a pre-selected location (i.e., an optimal sensing point), the local voltage feedback signal from that optimal sensing point can be used to adjust the power supply voltage and thus, to manage voltage distribution across the power distribution network. Additionally, the system and method can incorporate a policy for managing the voltage distribution across the network by regulating the power supply voltage, a means for profiling voltage drops across the power distribution network and a means for selecting the optimal sensing point based on both the policy and the profile. Thus, the system and method can optimize compensation of power supply voltage drops. Another embodiment of the system and method can further control power supply voltages to multiple discrete power distribution networks on the same chip.

While the invention has been described in terms of embodiments, those skilled in the art will recognize that the invention can be practiced with modification within the spirit and scope of the appended claims.

What is claimed is:

1. A method for controlling supply voltage to a power distribution network on a chip, said method comprising;
    providing an on-chip sensing network having multiple switches that allow said sensing network to be selectively connected to said power distribution network at any one of multiple locations;
    selectively connecting said sensing network to said power distribution network at a pre-selected location in order to generate a local voltage feedback signal from said pre-selected location; and
    regulating supply voltage from a drive transistor for said power distribution network based on said local voltage feedback signal.

2. The method of claim 1, wherein said regulating comprises using an operational amplifier to compare a reference voltage signal to an input signal that is based on said local voltage feedback signal and to adjust a gate voltage of said drive transistor until said input signal is equal to said reference voltage signal.

3. The method of claim 1, further comprising before said selectively connecting, selecting said pre-selected location.

4. The method of claim 3, wherein said selecting of said pre-selected location comprises:
    establishing a policy for managing voltage distribution across said power distribution network;
    developing a profile of voltage drops across said power distribution network; and
    selecting said pre-selected location as dictated by said policy based on said profile.

5. The method of claim 4, wherein said policy is established such that said policy dictates one of the following:
    regulate said supply voltage such that a minimum local voltage is maintained across said power distribution network by selecting as said pre-selected location that one of said multiple locations which exhibits the greatest amount of supply voltage drop relative to all others of said multiple locations;
    regulate said supply voltage such that a maximum local voltage is maintained across said power distribution network by selecting as said pre-selected location that one of said multiple locations which exhibits the least amount of supply voltage drop relative to all others of said multiple locations; and
    regulate said supply voltage such that an average local voltage is maintained across said power distribution network by selecting as said pre-selected location that one of said multiple locations that exhibits an amount of supply voltage drop approximately equal to an average supply voltage drop across said power distribution network.

6. The method of claim 4, wherein said developing of said profile comprises:
    alternately connecting said sensing network to said power distribution at said multiple locations so as to generate multiple local voltage feedback signals;

determining differences between each of said multiple local voltage feedback signals and a supply voltage feedback signal.

7. The method of claim 4, wherein said developing of said profile comprises developing different profiles for different chip operating modes.

8. The method of claim 1, further comprising:

providing a second on-chip sensing network having second switches that allow said second sensing network to be selectively connected to a second power distribution network on said chip at any one of multiple second locations in order to generate second local voltage feedback signals;

selectively connecting said second sensing network to said second power distribution network at a second pre-selected location in order to generate a second local voltage feedback signal from said second pre-selected location; and adjusting a second gate voltage of a second drive transistor for said second power distribution network to regulate a second supply voltage from said second drive transistor to said second power distribution network based on said second local voltage feedback signal.

9. The method of claim 8, further comprising establishing a second policy that dictates how said second supply voltage should be regulated relative to said first supply voltage.

* * * * *